United States Patent [19]
Bauhahn

[11] Patent Number: 5,696,662
[45] Date of Patent: Dec. 9, 1997

[54] ELECTROSTATICALLY OPERATED MICROMECHANICAL CAPACITOR

[75] Inventor: Paul E. Bauhahn, Fridley, Minn.

[73] Assignee: Honeywell Inc., Minneapolis, Minn.

[21] Appl. No.: 517,221

[22] Filed: Aug. 21, 1995

[51] Int. Cl.[6] .................................................. H01G 5/06
[52] U.S. Cl. ........................... 361/298.1; 361/306.1; 361/306.3; 361/290
[58] Field of Search ........................... 361/301.4, 306.3, 361/311, 306.1, 312, 313, 299.2, 321.2–321.4, 290, 296, 298.3, 298.2, 298.1; 257/295, 296, 301, 303, 308

[56] References Cited

U.S. PATENT DOCUMENTS 5,003,428  3/1991  Shepherd ........................... 361/321.4
5,399,415  3/1995  Chen et al. .

*Primary Examiner*—Leo P. Picard
*Assistant Examiner*—Anthony Dinkins
*Attorney, Agent, or Firm*—John G. Shudy, Jr.

[57] ABSTRACT

An electrostatically controlled, micromachined micromechanical capacitor having an adjustable, extensive tuning range. A configuration consists of a set of various sized beams or plates adjacent to a common plate or plates. The pairs of plates are linearly moved relative to each other to provide an adjustable capacitance. The movement of the plates is caused electrostatically by an application of a DC or low frequency voltage to the respective plates. The signals that are processed by these micromechanical capacitors are typically in the megahertz range and higher. The process for micromachining the micromechanical capacitor is similar to the process utilized in integrated circuit fabrication.

10 Claims, 5 Drawing Sheets

STARTING SUBSTRATE

DIELECTRIC DEPOSITION

DEPOSIT 1ST METAL & RESISTOR

DIELECTRIC DEPOSITION

DEPOSIT SACRIFICIAL LAYER

PLATE 2ND METAL

2ND SACRIFICIAL LAYER

PLATE 3RD METAL

REMOVE SACRIFICIAL LAYERS

ELECTROSTATICALLY OPERATED MICROMECHANICAL CAPACITOR

BACKGROUND

The invention pertains to micromachined devices and particularly to micromechanical capacitors on a substrate. The invention more particularly pertains to such capacitors having an adjustable capacitance.

SUMMARY OF THE INVENTION

The present invention is an elecrostatically controlled, micromachined microcapacitor having a widely adjustable tuning range. This device has no sliding contacts like the capacitors of the related art, such as those that have capacitor plates on an axis that move parallel to each other. The process of micromachining for making the micromechanical mechanism, i.e., the capacitor, is essentially the same as common integrated circuit processes. However, the stresses are more significant and critical in micromachining than in integrated circuit technology. These capacitors may be fabricated in an integrated circuit with the same process that is used to fabricated the integrated circuit itself.

The present invention is a digitally tuned capacitor having a set of beams or plates of various widths placed adjacent to a common plate. The plates are selectively, electrostatically and linearly moved in combination to or from the common plate to provide a desired capacitance which can be adjusted.

The invention has application in tunable radio frequency and microwave circuits. It also has application to devices used for impedance-matching integrated circuits to external circuits that operate at various frequencies. The invention may be used in an amplifier for providing an adjustable bandwidth for amplifying signals for maximum gain at certain frequencies or for adjusting other electronic characteristics. For instance, it may be used for a tunable oscillator.

BRIEF DESCRIPTION OF THE DRAWING

FIG. 3a shows a digitally-tuned micromechanical capacitor.

FIG. 3b is a schematic of the capacitor in FIG. 3a.

DESCRIPTION OF THE EMBODIMENTS

Figure 1:
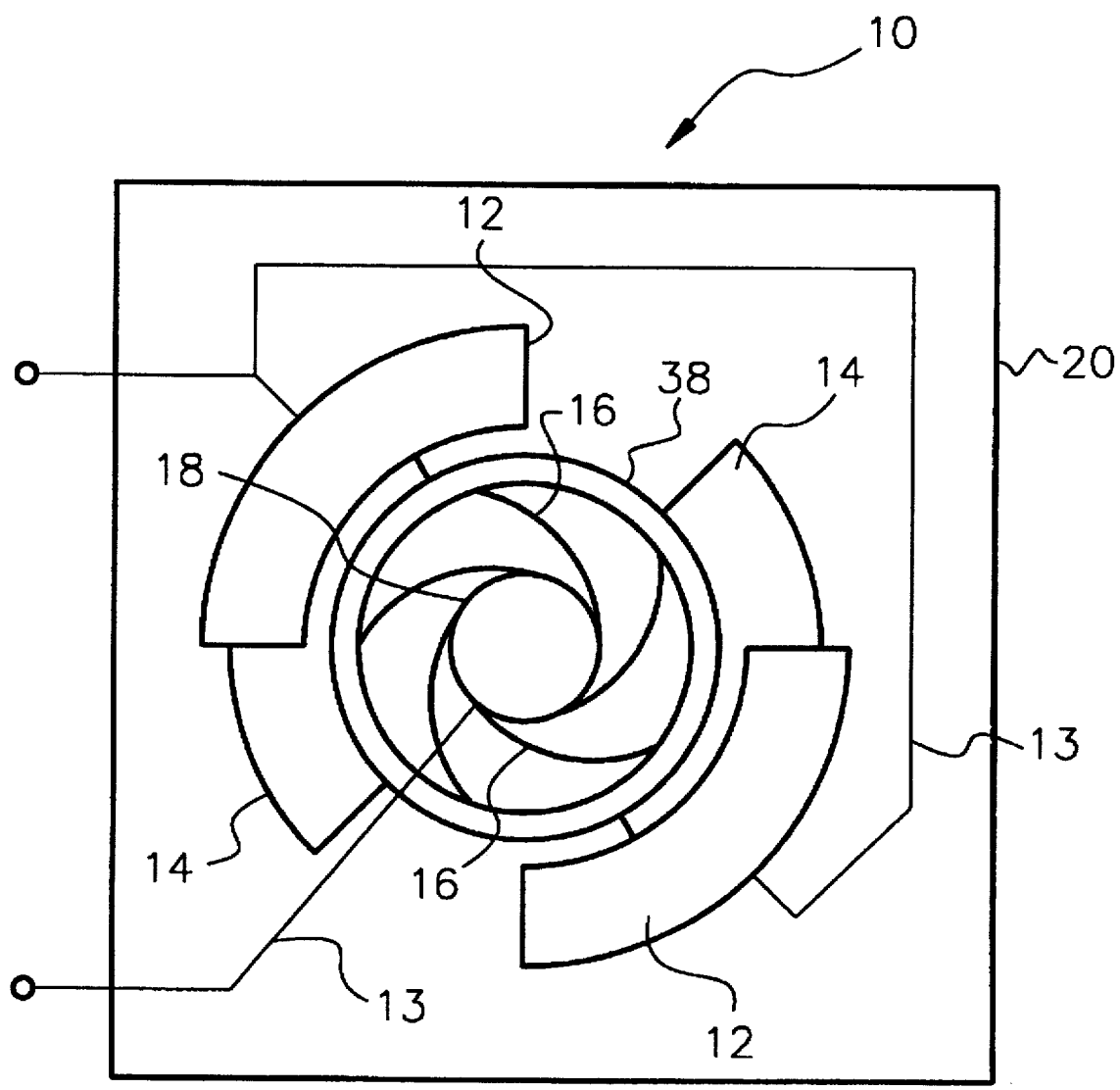
FIG. 1 is a diagram of a rotary-tuned micromechanical capacitor.

FIGS. 1 and 2a–2c show views of the electrostatically operated, micromechanical capacitor 10 having a broad tuning range. Capacitor 10 has a micromechanical varactor design that incorporates a wide tuning range of a variable capacitor having overlapping or interleaved capacitor plates 12 and 14 with the reproducible motion of watch-like springs 16 which are spiral metallic or dielectric arms. A fixed center post 18 supports rotatable capacitor plates 14 via springs 16. Post 18 and capacitor plates 14 are formed on and supported by substrate 20. In a quiescent state, plates 14 are symmetrically rotationally located between the two pairs of plates 12. When the plates overlap, each plate 14 is sandwiched between a pair of plates 12.

Figure 2A:
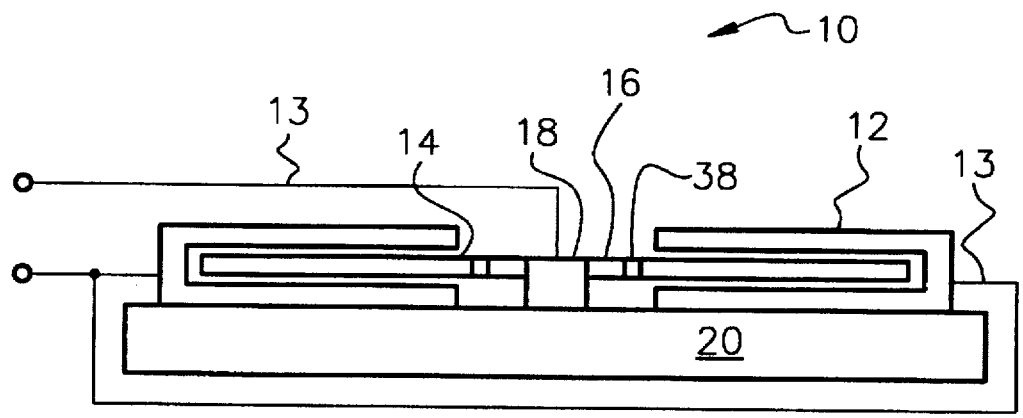
FIGS. 2a–2c are section views of the capacitor in FIG. 1, having various electrode connections.

Plates 14 form one electrode of variable capacitor 10 and the pairs of plates 12 form the other electrode of capacitor 10, according to the configuration of FIG. 2a. When no signal is applied to plates 12 and 14, each plate 14 is rotationally situated and symmetrically located between the respective pairs of plates 12. This is the position of equilibrium of plates 14 relative to plates 12, which is provided by springs 16. A voltage applied across plates 12 and 14 results in an electrostatic torque that changes the rotational position of plates 14 in relation to plates 12, and consequently changes the value of capacitor 10. The equilibrium position of the plates 14 relative to plates 12, in absence of an external or electrostatic force, results in a minimum value of capacitance of capacitor 10.

The electrostatic force used for causing an adjusting or trimming movement of plates 14 relative to plates 12 may be from an electrical signal having a low frequency (relative to the frequency of the signal that the capacitance of the plates is to affect) or by a direct current (DC). The capacitor-plate-position-controlling signal (i.e., the capacitance trimming or adjustment signal) to capacitor 10 may be superimposed on the signal to be processed or affected by capacitor 10. On the other hand, the signal that is to be processed or affected may be superimposed on the capacitance-controlling DC or lower frequency signal (e.g., one kilohertz). The signal to be processed may be in the megahertz to gigahertz range. The voltages of the signals may range from microvolts to tens of volts.

By supporting the center plate 14 with spiral dielectric or metallic arms 16, the torque required to rotate the structure is minimal and easily effected with an electrostatic force of the low frequency or DC signal present on plates 12 and 14. Springs 16 are typically made from the same metal as plate 14. Plates 12 and 14 are made from metal such as nickel with a gold flash on it or copper with a gold flash. Plates 12 and 14 may have a diameter from 200 to 400 microns. The distance between plates 12 and adjacent plate 14 is from one to two microns. Springs 16 are of the same thickness of plate because they are of the same layer used for plate 14. Springs 16 are about 0.5 micron wide and from one to two microns thick.

The Q of capacitor 10 is in the hundreds. The switching or adjustment speeds of capacitor 10 is the millisecond or less range, which is sufficient for nearly all applications of the capacitor.

The capacitance between a set of plates 12 and 14 is in the picofarad range. Capacitors 10 can be connected in parallel with one another into an array for larger capacitances and/or greater adjustment of capacitance.

Figure 2B:
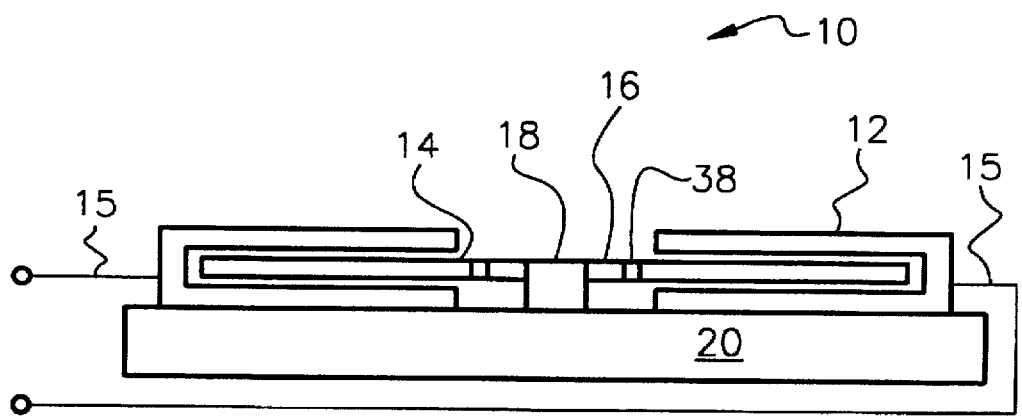
Figure 2C:
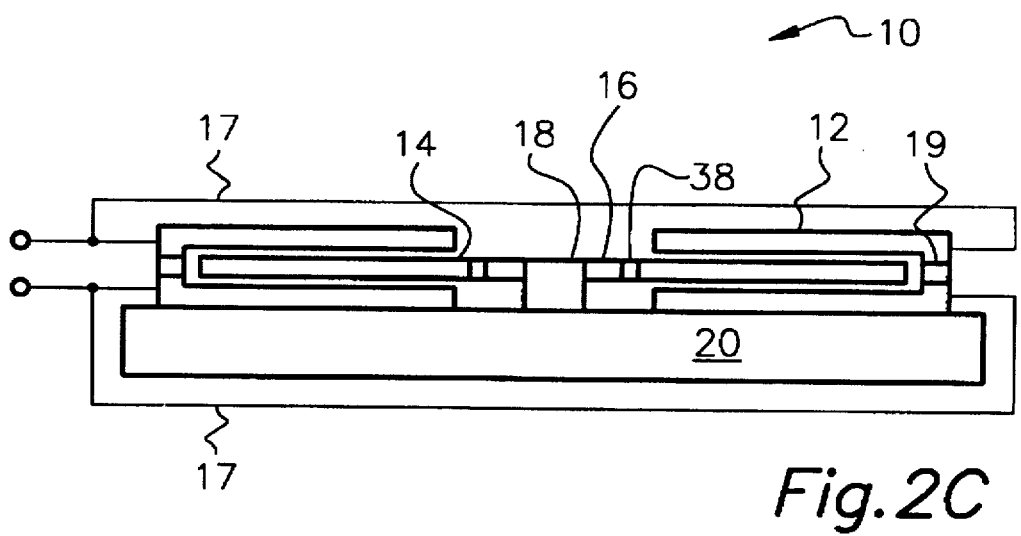

Several configurations are possible with structure 10 as shown in FIGS. 2a–2c. For the first one noted above in FIG. 2a, metallic spiral arms 16 are employed and the center support post 18 provides the connection to one side of the capacitor giving a larger value of capacitance than that of the other configurations. Plates 12 are one electrode and plates 14 are the other electrode of capacitor 10. The electrode connections are shown by wiring 13. For a second configuration shown in FIG. 2b, dielectric spiral arms 16 are used and the diametrically opposite plates 14 are connected together through a radial metallic ring 38, without an external connection needed. Each pair of plates 12 is an electrode of capacitor 10. The electrode connections are shown by wiring 15. With two variable capacitors in series with each other, the overall capacitance is lower than that of the first configuration. However, the series inductance is lower than that of the first configuration since the conductive path through the spiral of springs 16 is eliminated. A third configuration is shown in FIG. 2c. Each plate of the pairs of adjacent plates 12 are insulated from each other by insulator 19. The diametrically positioned plates 14 are respectively connected to each other. One electrode is top plates 12 and the other electrode is bottom plates 12. The electrode connections are shown by wiring 17. The electrical characteristics of the capacitor in FIG. 2c are like those of the capacitor in FIG. 2b.

Figures 3A, 3B:
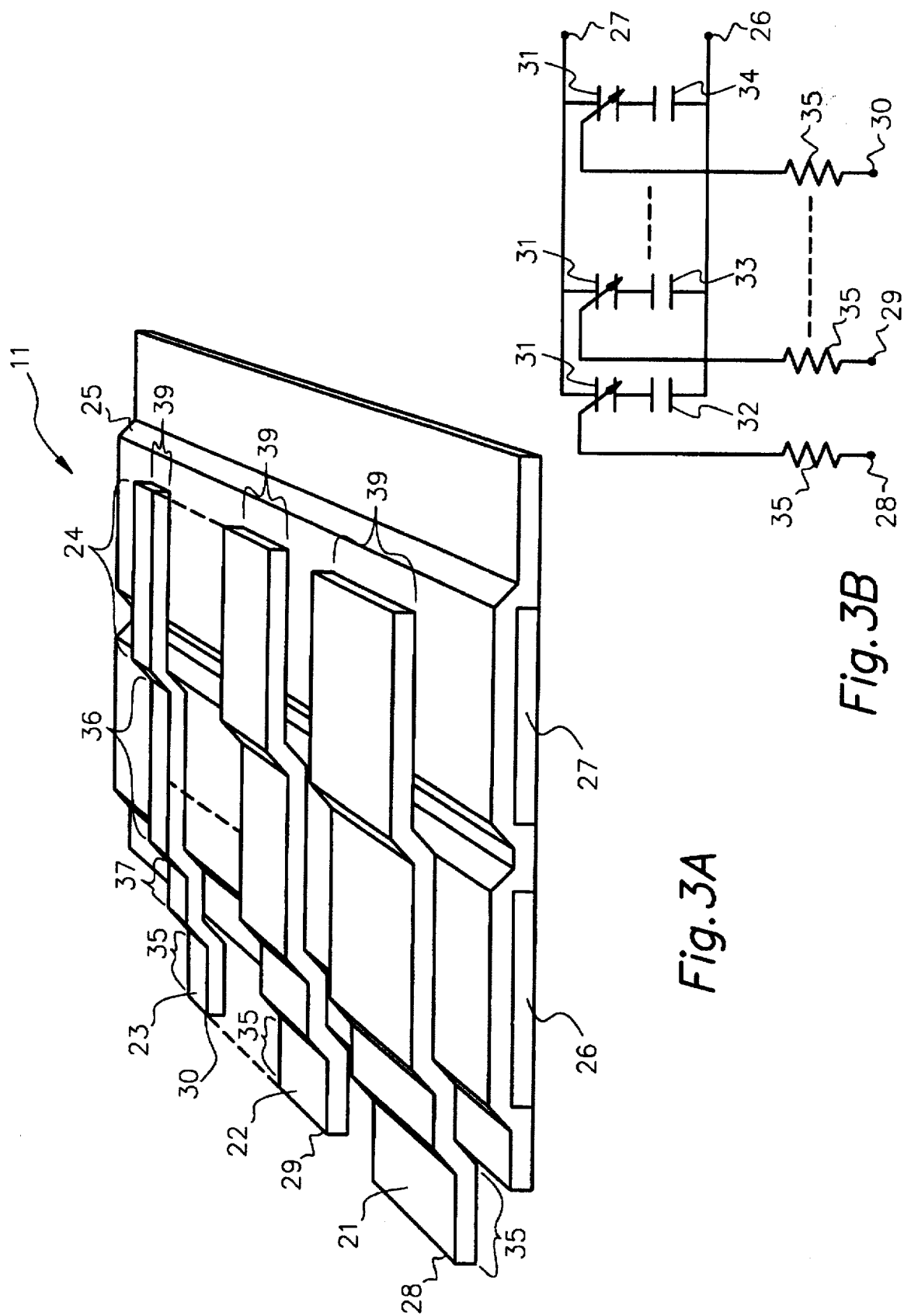

FIG. 3a shows a digitally tunable capacitor 11 which has transverse beam 21, 22 and 23 of various widths 39. Capacitor 11 may be a binary tunable capacitor. Each transverse beam has a portion 24 which is naturally positioned several microns apart from the surface of dielectric 25 covering longitudinal beam 27. Transverse beams 21, 22 and 23 are spring-like and are secured to the dielectric at portion 37. A voltage applied between longitudinal electrode 27 and end 28 of transverse beam 21, end 29 of transverse beam 22, or end 30 of transverse beam 23, causes portion 24 to be moved in contact with the surface of dielectric 25 which effectively closes a capacitive switch 31 FIG. 3b, respectively, for connecting transverse beam capacitance 32, 33 or 34 between longitudinal beam electrodes or terminals 26 and 27. Portion 35 of each transverse beam is a resistor 35 which is in series between terminal 28, 29 or 30 of the transverse beam and capacitive switch 31. Portion 36 of transverse beam 21, 22 or 23 may be a capacitive connection between the transverse beam and longitudinal electrode 26 or there may be a via in the dielectric with a conductive material such as a metal between portion 36 and electrode 21. On the other hand, end 28, 29 or 30 of transverse beam may serve as an electrode in lieu of longitudinal beam connection 26 of capacitor 32, 33 or 34, respectively, although the series resistor 35 reduces the Q of the capacitor. The Q of such configuration may be increased by replacing resistor 35 with a highly conductive material such as a metal. For either connection configuration, the control signals and capacitively processed signals are combined like those for capacitor 10. If longitudinal beam connection 26 is an electrode, then the capacitance between portion 36 of transverse beam and longitudinal beam electrode 26 is effectively in series with capacitance 32, 33 or 34. The latter connection configuration results in less capacitance than the former connection configuration noted above.

The control signal to lead 28, 29 or 30 of transverse beam may be a low frequency (e.g., 1 KHz) or DC voltage logic signal (having an amplitude of five to twenty volts) to pull portion 24 of the respective transverse beam 28, 29 or 30, against longitudinal beam dielectric 25 to close the capacitive switch that exists in effect between transverse beam portion 24 and a longitudinal beam dielectric 25.

Transverse beams 21, 22 or 23 may be 1 to 200 microns wide. Portion 24 may be from 100 to 500 microns long, portion 36 may be from 500 to 1000 microns and resistor 35 may be from 10 to 100 microns long. Portion 24 of transverse beam 21, 22 or 23 may be one to two microns thick. The adjacent transverse beams of the digitally tunable capacitor may have relative widths 39 that are a factor of two smaller or larger. For instance, in a binary capacitor 11, width 39 of transverse beam 22 is one-half of the size of width 39 of transverse beam 21, width 39 of transverse beam 23 is one-half of the size of width 39 of transverse beam 22, and so on. A desired capacitance can be selected by logic voltage signals applied across 27 and 28, 29, and/or 30, and so on. In a six transverse beam capacitor, assuming the largest transverse beam 21 to have an "on" capacitance value of one unit across longitudinal beam terminals 26 and 27 (FIGS. 3a and 3b), capacitor 11 can have a value selected from zero to one-and-31/32 units which can be varied in increments of 1/32nd-sized units with least-significant bit value changes of an applied six bit logic signal.

Digitally tunable capacitor 11 has lower losses than a solid state capacitor. Some of the solid state capacitor losses are due to a nonlinearity caused by a change in amplitude of the signal in the device, such as a reverse-biased diode functioning as a solid state capacitor wherein the depletion width is changed to change the capacitance. The Q of the solid state device having a change of capacitance ratio of 10/1, may be very low such as 1–3. However, for a solid state capacitor having a smaller capacitance change ratio, the Q can be as high as 20. A solid state capacitor can tune to a selected value of capacitance within a microsecond, which is a speed not typically needed in most applications. The present digitally tunable capacitor can be tuned to a selected value of capacitance within hundreds of microseconds, which is a sufficient speed for nearly all applications. Further, the digitally tunable capacitor, e.g., the binary tunable capacitor, can have both a Q value greater than 100 and a capacitance change ratio greater than 100.

Figure 4A:
FIGS. 4a–4i illustrate a series of process steps for making rotary-tuned and digitally-tuned micromechanical capacitors.
Figure 4B:
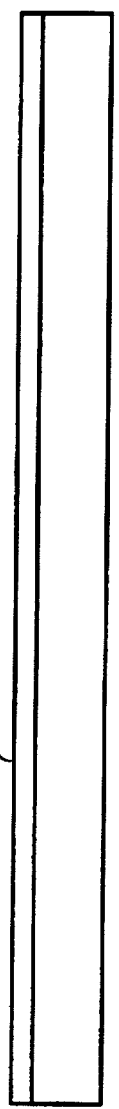
Figure 4C:
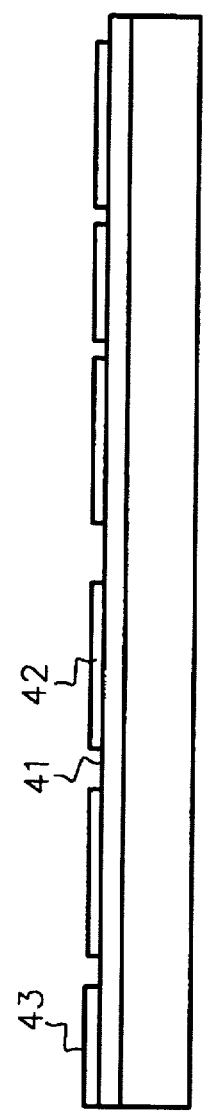
Figure 4D:
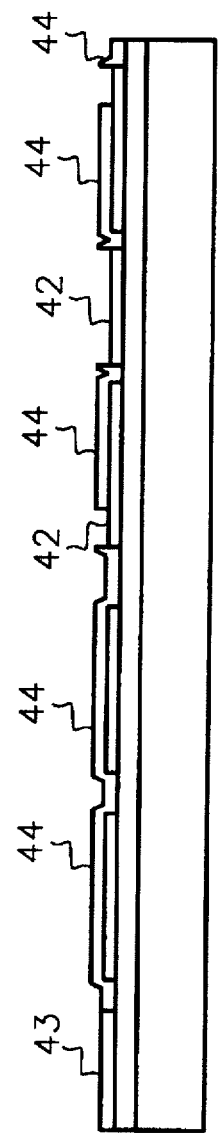

The process for fabricating digitally tunable capacitor 11 can involve the same and simultaneous process as that for rotary-tunable capacitor 10, on the same substrate. One may start with a substrate 40 of GaAs, sapphire, quartz or semiinsulating silicon shown in FIG. 4a. Substrate 40 may be about 625 microns thick. A layer 41 of dielectric composition of silicon dioxide, silicon nitride or other dielectric material at a thickness of 1–2 microns is formed on substrate 40 in FIG. 4b. Then layer 41 is masked with a photo resist, exposed to a metal layer, and then the photo resist is removed. The photo resist material is a common and commercially available material. Alternatively, one may deposit the metal on first, mask the metal layer, remove or etch the unmasked portions of the metal, and then remove photo resist. The metal layer may be formed at a thickness from 500 to 4000 angstroms. The metal may be nickel, nichrome, gold-copper, or nickel-copper. Either process results in metal islands 42 of FIG. 4c. The process is repeated for making a resistor island 43 in FIG. 4c. Resistor island 43 may be of nichrome, tantalum-nitride, chrome-silicon or other like composition. The thickness of resistor 43 is about 2000 angstroms. About 2000 angstroms of a dielectric layer is deposited after resistor 43 and portions of some metal islands 42 are masked; or the dielectric is deposited on all exposed surfaces in FIG. 3c, then much of the area is masked except resistor 43 and portions of islands 42, and etching is performed in the unmasked areas. The masking is removed resulting in the remaining dielectric layers 44 as shown in FIG. 4d.

Figure 4E:
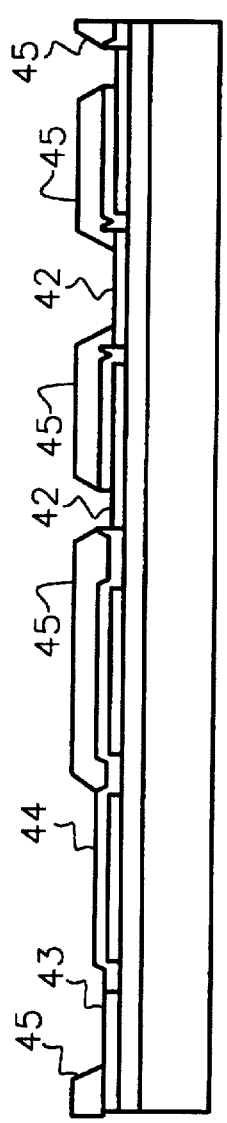
Figure 4F:
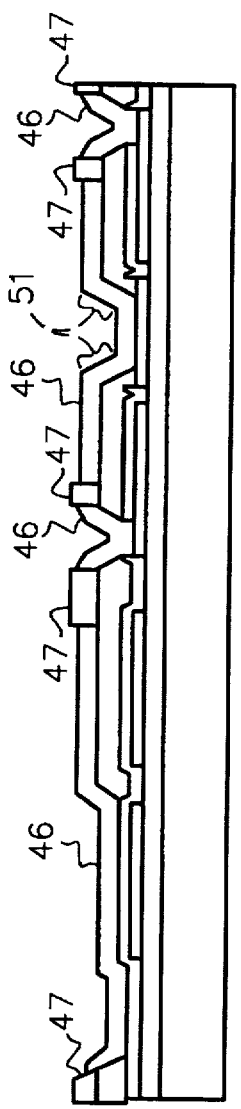
Figure 4G:
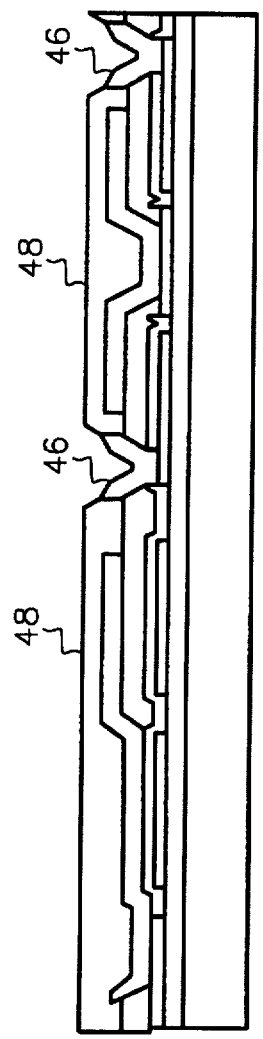
Figure 4H:
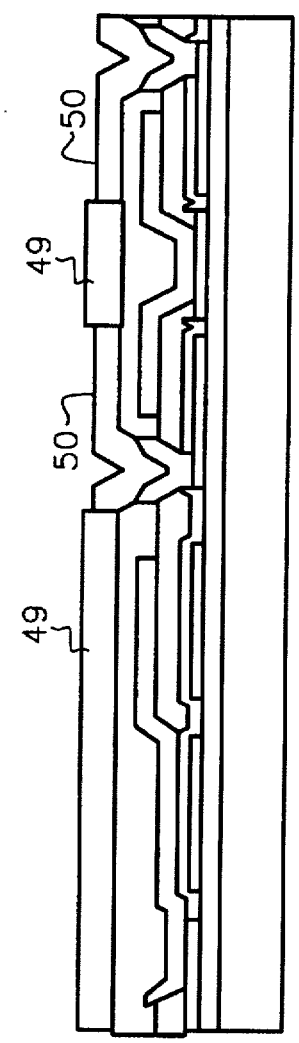
Figure 4I:
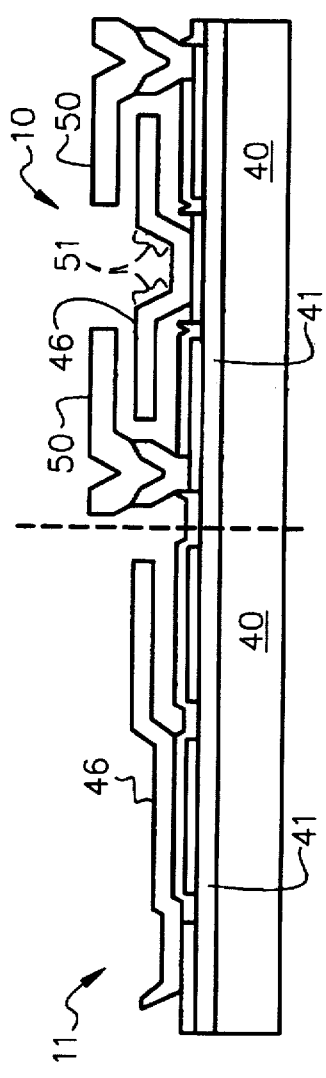

Next, a photo resist is applied on a portion of resistor 43, all of dielectric areas or islands 44 except for a portion of one dielectric area 44. A sacrificial layer of two to three microns is deposited on everything covered and not covered by the photo resist layer. The sacrificial layer is composed of an easy to etch material such as a bias sputtered quartz (SiO$_2$) or polymide. The photo resist is removed along with the sacrificial material formed on the photo resist; or the sacrificial layer may be applied, the sacrificial layer masked, and portions of the sacrificial layer then etched away before the removal of the photo resist. This results in islands 45 of sacrificial material on a portion of resistor 43 and on most of dielectric islands or areas 44 as shown in FIG. 4e. A photo resist is applied on only certain portions of sacrificial layer areas or islands 45. A plating base is applied on everything covered and not covered by the photo resist. The plating base is about 600 angstroms thick and is gold, titanium-gold or titanium. The plating base is an adhesion layer for the metal plating to follow. The metal plating is deposited at about 1 to 2 microns thick on the plating base layer. The metal of the plating may be nickel, gold, copper, or nickel-copper. The photo resist along with the plating base and metal plating on the photo resist is removed resulting in areas or islands 46. The removed photo resist also results in spring-like spirals in regions 51 of the second largest island at the right of FIG. 4f. Photo resist is applied on two smaller islands 46, the first and third from the left in FIG. 4f. Then a second sacrificial layer of 2 to 3 microns is applied. The photo resist is removed resulting in relatively large islands 48 in FIG. 4g. A photo resist 49 is applied on all of left island 48 and on only a middle portion of right island 48 of FIG. 4g. A plating base is applied followed by a plating of a third metal layer on the base. The base and metal are the same as above. The photo resist is removed along with the metal plate and base on the photo resist, which leaves the metal islands 50 in FIG. 4h. Finally, sacrificial layers 49, 48 and 45 are removed or etched away, with a solvent such as buffered HF or a commercial substance for removal of the sacrificial material. The result is a digitally tuned capacitor 11 and rotary tuned capacitor 10.

I claim:

1. A micromechanical capacitor comprising:

a longitudinal plate formed on a first portion of a substrate;

a dielectric layer formed on said longitudinal plate and on a second portion of the substrate;

a plurality of transversal plates formed on said dielectric layer wherein a first portion of each of said plurality of transversal plates is in contact with said dielectric layer situated on the second portion of the substrate, and a second portion of each plate of said plurality of transversal plates is positioned over said dielectric layer formed on said longitudinal plate; and wherein:

said longitudinal plate and each plate of said plurality of transversal plates are electrodes of said micromechanical capacitor; and the second portion of each plate of said plurality of transversal plates is at a distance from said dielectric layer.

2. The micromechanical capacitor of claim 1 wherein an application of a voltage across said longitudinal plate and one or more plates of said plurality of transversal plates causes the one or more plates, respectively, of said plurality of transversal plates, to move so as to be in contact with said dielectric layer thereby changing the capacitance of said capacitor.

3. A micromechanical capacitor comprising:

a substrate;

a first longitudinal plate formed on said substrate;

a second longitudinal plate formed on said substrate;

a dielectric layer formed on said first and second longitudinal plates; and at least one transversal plate having a first portion formed on said dielectric layer and having a second portion; and wherein:

the first portion of said at least one transversal plate is in contact with said dielectric layer formed on said first longitudinal plate; and the second portion of said at least one transversal plate is situated at a distance from said dielectric layer formed on said second longitudinal plate.

4. The micromechanical capacitor of claim 3 wherein an application of a voltage from a source connected to said second longitudinal plate and said at least one transversal plate, causes the second portion of said at least one transversal plate to move so as to be in contact with said dielectric layer formed on said second longitudinal plate, thereby changing the capacitance across said first and second longitudinal plates.

5. A micromechanical capacitor comprising:

a first conductive plate formed on a first portion of a substrate;

a dielectric layer formed on said first conductive plate and on a second portion of the substrate;

a plurality of second conductive plates formed on said dielectric layer wherein a first portion of each of said plurality of second conduct-ire plates is in contact with said dielectric layer situated on the second portion of the substrate, and a second portion of each plate of said plurality of second conductive plates is positioned over said dielectric layer formed on said first conductive plate; and wherein:

said first conductive plate and each plate of said plurality of second conductive plates are electrodes of said micromechanical capacitor; and the second portion of each plate of said plurality of second conductive plates is at a distance from said dielectric layer.

6. The micromechanical capacitor of claim 5 wherein an application of a voltage across said first conductive plate and one or more plates of said plurality of second conductive plates causes the one or more plates, respectively, of said plurality of second conductive plates, to move so as to be in contact with said dielectric layer thereby changing the capacitance of said capacitor.

7. A micromechanical capacitor comprising:

a substrate;

a first conductive plate formed on said substrate;

a second conductive plate formed on said substrate;

a dielectric layer formed on said first and second conductive plates; and a third conductive plate having a first portion formed on said dielectric layer and having a second portion; and wherein:

the first portion of said third conductive plate is in contact with said dielectric layer formed on said first conductive plate; and the second portion of said third conductive plate is situated at a distance from said dielectric layer formed on said second conductive plate.

8. The micromechanical capacitor of claim 7 wherein an application of a voltage from a source connected to said second conductive plate and said third conductive plate, causes the second portion of said third conductive plate to move so as to be in contact with said dielectric layer formed on said second conductive plate, thereby changing the capacitance across said first and second conductive plates.

9. A micromechanical capacitor comprising:

a longitudinal plate formed on a first portion of a substrate;

a dielectric layer formed on said longitudinal plate and a second portion of the substrate a transversal plate formed on said dielectric layer wherein a first portion of said transversal plate is in contact with said dielectric layer formed on the second portion of the substrate, and a second portion of said transversal plate is positioned over said dielectric layer formed on said longitudinal plate; and wherein:
said longitudinal and transversal plates are electrodes of said capacitor;

the second portion of said transversal plate is at a distance from said dielectric layer; and an application of a voltage across said longitudinal and transversal plates causes said transversal plate to move so as to be in contact with said dielectric layer thereby changing the capacitance of said capacitor.

10. A micromechanical capacitor comprising:

a first conductive plate formed on a first portion of a substrate;

a dielectric layer formed on said first conductive plate and a second portion of the substrate a second conductive plate formed on said dielectric layer wherein a first portion of said second conductive plate is in contact with said dielectric layer formed on the second portion of the substrate, and a second portion of said second conductive plate is positioned over said dielectric layer formed on said first conductive plate; and wherein:
said first and second conductive plates are electrodes of said capacitor;

the second portion of said second conductive plate is at a distance from said dielectric layer; and an application of a voltage across said first and second conductive plates causes said second conductive plate to move so as to be in contact with said dielectric layer thereby changing the capacitance of said capacitor.

* * * * *